US011493752B2

(12) United States Patent
Kirillov

(10) Patent No.: US 11,493,752 B2
(45) Date of Patent: Nov. 8, 2022

(54) METHOD OF RECTANGULAR 2D PATTERN GENERATION WITH LISSAJOUS SCANNING

(71) Applicant: Infineon Technologies AG, Neubiberg (DE)

(72) Inventor: Boris Kirillov, Judendorf-Straßenge (AT)

(73) Assignee: Infineon Technologies AG, Neubiberg (DE)

( * ) Notice: Subject to any disclaimer, the term of this patent is extended or adjusted under 35 U.S.C. 154(b) by 69 days.

(21) Appl. No.: 17/193,303

(22) Filed: Mar. 5, 2021

(65) Prior Publication Data
US 2022/0283429 A1 Sep. 8, 2022

(51) Int. Cl.
G02B 26/10 (2006.01)
G02B 26/08 (2006.01)
G09G 3/02 (2006.01)

(52) U.S. Cl.
CPC ......... *G02B 26/101* (2013.01); *G02B 26/085* (2013.01); *G02B 26/0841* (2013.01); *G09G 3/025* (2013.01); *G09G 2310/08* (2013.01)

(58) Field of Classification Search
CPC .......................... G02B 26/101; G02B 26/0841; G02B 26/085; G02B 27/18; G02B 26/105; G09G 3/025; G09G 2310/08; H04N 5/2256; H04N 9/3155; G01S 17/89; A61B 1/0008
See application file for complete search history.

(56) References Cited

U.S. PATENT DOCUMENTS

| 11,270,418 | B1* | 3/2022 | Hwang | G01S 17/89 |
| 2004/0218155 | A1* | 11/2004 | Schenk | G02B 27/18 |
| | | | | 348/E5.139 |
| 2005/0116038 | A1* | 6/2005 | Lewis | A61B 1/0008 |
| | | | | 235/462.36 |
| 2008/0218835 | A1* | 9/2008 | Sandner | H04N 9/3155 |
| | | | | 348/E9.026 |
| 2008/0239445 | A1* | 10/2008 | Ando | G02B 26/105 |
| | | | | 359/224.1 |

(Continued)

Primary Examiner — Richard J Hong
(74) Attorney, Agent, or Firm — Harrity & Harrity, LLP

(57) ABSTRACT

A method of Lissajous scanning includes transmitting a plurality of light pulses at a plurality of time moments based on a trigger signal; driving about a first rotation axis at a first driving frequency (f1) according to a first driving signal and driving about a second rotation axis at a second driving frequency (f2) according to second driving signal; controlling the first and second driving signals to generate a Lissajous scanning pattern according to a predefined frame rate (FR); selecting the first and second driving frequencies such that the frame rate is a greatest common divisor thereof and such that they satisfy the following equation: f2−f1= (2*N+1)*FR; determining the plurality of time moments; and generating the trigger signal based on the determined plurality of time moments, wherein the plurality of time moments ($t_i$) are determined according to the following equation:

$$t_i = \frac{2i+1}{8 * FR * F_1 F_2},$$

where: $F_1 = \frac{f_1}{FR}$, $F_2 = \frac{f_2}{FR}$, $i = 0, 1, 2 \ldots (4F_1F_2 - 1)$.

24 Claims, 5 Drawing Sheets

(56) References Cited

U.S. PATENT DOCUMENTS

| | | | |
|---|---|---|---|
| 2015/0286048 A1* | 10/2015 | Chen ................... | G02B 26/101 |
| | | | 359/200.7 |
| 2015/0286050 A1* | 10/2015 | Lee ..................... | G02B 26/105 |
| | | | 318/116 |
| 2020/0348510 A1* | 11/2020 | Hwang ............... | H04N 5/2256 |

* cited by examiner

METHOD OF RECTANGULAR 2D PATTERN GENERATION WITH LISSAJOUS SCANNING

BACKGROUND

Lissajous scanning is a type of scanning implemented in display application, light scanning applications, and light steering applications, to name a few. For example, Lissajous scanning may be used in displays, Light Detection and Ranging (LIDAR), and automotive headlights in which light beams are steered by a scanning system according to a Lissajous pattern.

Lissajous scanning is typically done by two resonant scanning axes which are each driven at constant scanning frequency with a defined frequency ratio/difference therebetween that forms a specific Lissajous pattern and frame rate. However, to date, Lissajous scanning results in the generation of random irregular patterns, non-rectangular patterns, and/or non-maximized pattern density. Accordingly, Lissajous scanning has not been optimized for sensitive applications, such as LIDAR, that require regular, dense patterns. In safety critical applications, again such as LIDAR, this could lead to lower resolutions or gaps in data.

Therefore, an improved system and method that is capable of generating a dense, rectangular, repeatable pattern with Lissajous scanning may be desirable.

SUMMARY

One or more embodiments provide a Lissajous scanning system that includes: a transmitter configured to transmit a plurality of light pulses at a plurality of time moments based on a trigger signal, wherein each light pulse is triggered at a respective time moment; a first oscillator structure configured to oscillate about a first rotation axis; a second oscillator structure configured to oscillate about a second rotation axis; a driver circuit configured to generate a first driving signal to drive the first oscillator structure about the first rotation axis at a first driving frequency (f1) and generate a second driving signal to drive the second oscillator structure about the second rotation axis at a second driving frequency (f2); and a controller configured to control the first driving signal and the second driving signal in order to synchronize the first and the second oscillator structures and to generate a Lissajous scanning pattern according to a predefined frame rate (FR), wherein the controller is configured to select the first driving frequency and second driving frequency such that the frame rate is a greatest common divisor of the first driving frequency and second driving frequency and such that they satisfy the following equation:

f2−f1=(2*N+1)*FR, wherein N is an integer equal to or greater than zero, wherein the controller is further configured to determine the plurality of time moments and generate the trigger signal based on the determined plurality of time moments, wherein the controller is configured to determine the plurality of time moments (ti) according to the following equation:

$$t_i = \frac{2i+1}{8*FR*F_1F_2},$$

$$\text{where: } F_1 = \frac{f_1}{FR}, F_2 = \frac{f_2}{FR}, i = 0, 1, 2 \ldots (4F_1F_2 - 1).$$

One or more embodiments provide a Lissajous scanning system that includes a transmitter configured to transmit a plurality of light pulses at a plurality of time moments based on a trigger signal, wherein each light pulse is triggered at a respective time moment; an oscillator structure configured to oscillate about a first rotation axis and oscillate about a second rotation axis; a driver circuit configured to generate a first driving signal to drive the oscillator structure about the first rotation axis at a first driving frequency (f1) and generate a second driving signal to drive the oscillator structure about the second rotation axis at a second driving frequency (f2); and a controller configured to control the first driving signal and the second driving signal in order to synchronize oscillations of the oscillation structure about the first and the second rotation axes and to generate a Lissajous scanning pattern according to a predefined frame rate (FR), wherein the controller is configured to select the first driving frequency and second driving frequency such that the frame rate is a greatest common divisor of the first driving frequency and second driving frequency and such that they satisfy the following equation:

f2−f1=(2*N+1)*FR, wherein N is an integer equal to or greater than zero, wherein the controller is further configured to determine the plurality of time moments and generate the trigger signal based on the determined plurality of time moments, wherein the controller is configured to determine the plurality of time moments (ti) according to the following equation:

$$t_i = \frac{2i+1}{8*FR*F_1F_2},$$

$$\text{where: } F_1 = \frac{f_1}{FR}, F_2 = \frac{f_2}{FR}, i = 0, 1, 2 \ldots (4F_1F_2 - 1).$$

One or more embodiments provide a method of Lissajous scanning, including: transmitting a plurality of light pulses at a plurality of time moments based on a trigger signal, wherein each light pulse is triggered at a respective time moment; driving a first oscillator structure about a first rotation axis at a first driving frequency (f1) according to a first driving signal; driving a second oscillator structure about a second rotation axis at a second driving frequency (f2) according to second driving signal; controlling the first driving signal and the second driving signal in order to synchronize the first and the second oscillator structures and to generate a Lissajous scanning pattern according to a predefined frame rate (FR); selecting the first driving frequency and second driving frequency such that the frame rate is a greatest common divisor of the first driving frequency and second driving frequency and such that they satisfy the following equation: f2−f1=(2*N+1)*FR, wherein N is an integer equal to or greater than zero; determining the plurality of time moments; and generating the trigger signal based on the determined plurality of time moments, wherein the plurality of time moments (ti) are determined according to the following equation:

$$t_i = \frac{2i+1}{8*FR*F_1F_2},$$

where: $F_1 = \frac{f_1}{FR}, F_2 = \frac{f_2}{FR}, i = 0, 1, 2 \ldots (4F_1F_2 - 1)$.

One or more embodiments provide a method of Lissajous scanning, including: transmitting a plurality of light pulses at a plurality of time moments based on a trigger signal, wherein each light pulse is triggered at a respective time moment; driving an oscillator structure about a first rotation axis at a first driving frequency (f1) according to a first driving signal; driving the oscillator structure about a second rotation axis at a second driving frequency (f2) according to second driving signal; controlling the first driving signal and the second driving signal in order to synchronize oscillations of the oscillation structure about the first and the second rotation axes and to generate a Lissajous scanning pattern according to a predefined frame rate (FR); selecting the first driving frequency and second driving frequency such that the frame rate is a greatest common divisor of the first driving frequency and second driving frequency and such that they satisfy the following equation: f2−f1=(2*N+1)*FR, wherein N is an integer equal to or greater than zero; determining the plurality of time moments; and generating the trigger signal based on the determined plurality of time moments, wherein the plurality of time moments (ti) are determined according to the following equation:

$$t_i = \frac{2i+1}{8 * FR * F_1 F_2},$$

where: $F_1 = \frac{f_1}{FR}, F_2 = \frac{f_2}{FR}, i = 0, 1, 2 \ldots (4F_1F_2 - 1)$.

BRIEF DESCRIPTION OF THE DRAWINGS

Embodiments are described herein making reference to the appended drawings.

DETAILED DESCRIPTION

Figure 1A:
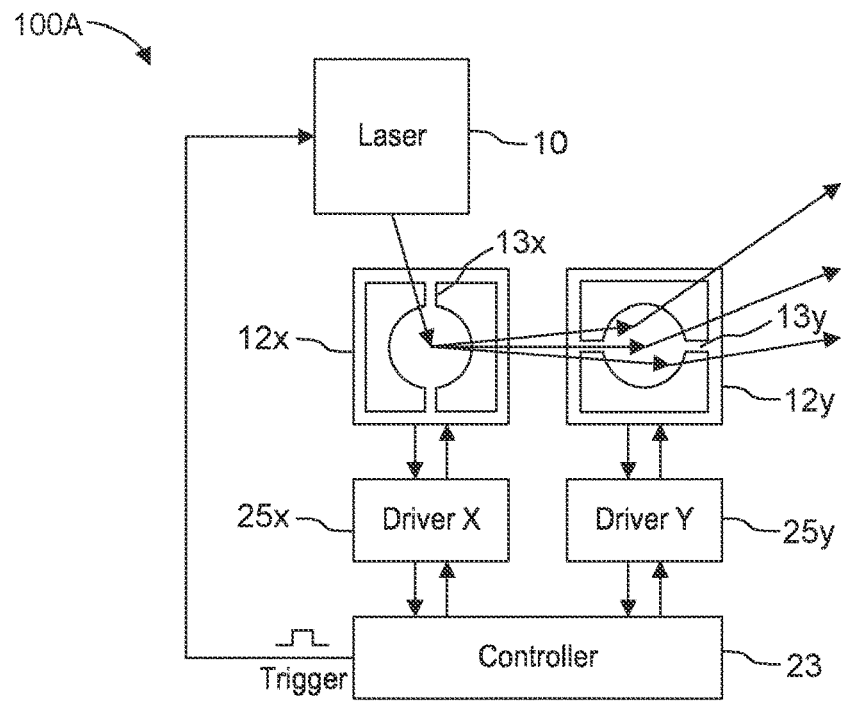
FIGS. 1A and 1B are a schematic block diagrams of Lissajous scanning systems according to one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical transmitters and optical transmitter systems configured to transmit light beams or pulses according to a scanning pattern, and, more particularly, according to a Lissajous scanning pattern. Light beams include visible light, infrared (IR) light, or other type of illumination signals. In some applications, the transmitted light may be backscattered by an object back towards the system where the backscattered light is detected by a sensor. The sensor may convert the received backscattered light into an electric signal, for example a current signal or a voltage signal, that may be further processed by the system to generate object data and/or an image.

For example, in Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light. Differences in return times for each light pulse across multiple pixels of the pixel array can then be used to make digital 3D representations of an environment or to generate other sensor data.

A Lissajous scan (e.g., according to a Lissajous scanning pattern that employs two scanning axes) can illuminate a scene in a continuous scan fashion. By emitting successive light pulses in different scanning directions, an area referred to as the field of view can be scanned and objects within the area can be detected and imaged. Thus, the field of view represents a scanning plane having a center of projection.

Lissajous scanning may also be useful in other applications, such as electronic displays for rendering images thereon and automotive headlights for steering light.

Figure 1B:
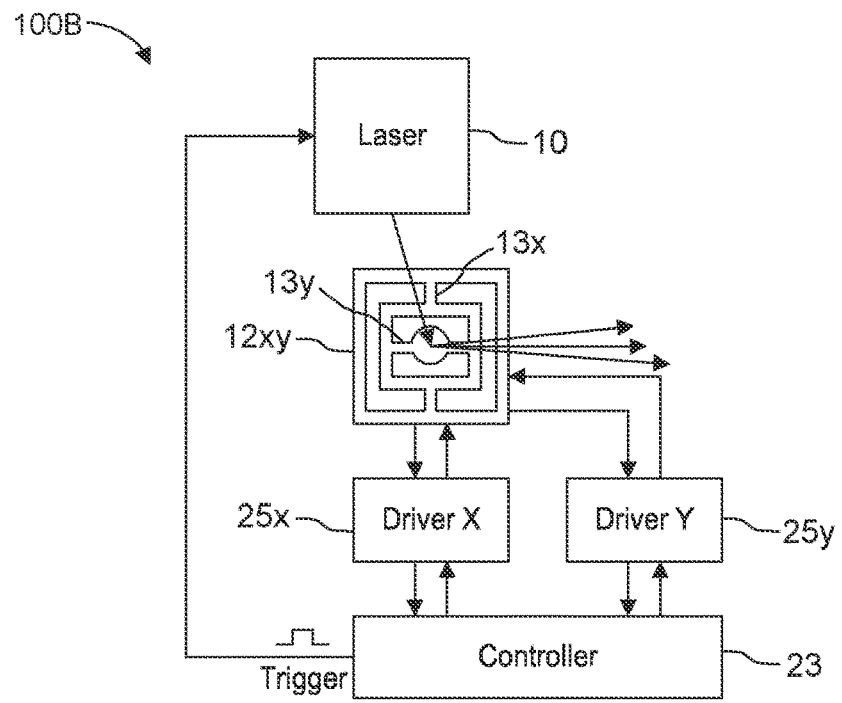

FIGS. 1A and 1B are a schematic block diagrams of Lissajous scanning systems 100A and 110B, respectively, according to one or more embodiments. In particular, the Lissajous scanning system 100A includes two one-dimensional (1D) MEMS mirrors 12x and 12y that are used to steer or otherwise deflect light beams (pulses) according to a Lissajous scanning pattern. In contrast, the Lissajous scanning system 100B includes a single two-dimensional (2D) MEMS mirror 12xy that is used to steer or otherwise deflect light beams (pulses) according to a Lissajous scanning pattern.

The MEMS mirrors 12x and 12y are mechanical moving mirrors (i.e., a MEMS micro-mirror) integrated on a semiconductor chip (not shown). A MEMS mirror according to the embodiments described herein is configured to oscillate via rotation about either a single resonant scanning axis (i.e., a 1D MEMS mirror) or two resonant scanning axes (i.e., a 2D MEMS mirror) that are typically orthogonal to each other. An oscillation of the MEMS mirror on a scanning axis may be done so between two predetermined extremum deflection angles (e.g., +/−15 degrees). A Lissajous scanner is configured to control the steering of the light beams in two dimensions (e.g., in a horizontal x-direction and in a vertical y-direction).

In the example shown in FIG. 1A, two 1D MEMS mirrors 12x and 12y are used to steer light beams in two dimensions. MEMS mirror 12x includes a first resonant scanning axis 13x that enables the MEMS mirror 12x to steer light in the x-direction, whereas MEMS mirror 12y includes a second resonant scanning axis 13y that enables the MEMS mirror 12yx to steer light in the y-direction. The two MEMS mirrors 12x and 12y are arranged sequentially along a transmission path of the light beams such that one of the MEMS mirrors (e.g., MEMS mirror 12x) first receives a light beam and steers it in a first dimension and the second one of the MEMS mirrors (e.g., MEMS mirror 12y) receives the light beam from the first MEMS mirror and steers it in a second dimension. As a result, the two MEMS mirrors 12x and 12y operate together to steer a light beam generated by an illumination unit 10 in two-dimensions. In this way, the two MEMS mirrors 12x and 12y can direct a light beam at a desired 2D coordinate (e.g., an x-y coordinate) in the field of view. Multiple light beams can be steered by the two MEMS mirrors 12x and 12y at different 2D coordinates of a Lissajous pattern.

In another example illustrated in FIG. 1B, one 2D MEMS mirror 12xy is used to steer light beams in two dimensions. MEMS mirror 12xy includes the first resonant scanning axis 13x that enables the MEMS mirror 12xy to steer light in the x-direction and the second resonant scanning axis 13y that enables the MEMS mirror 12xy to steer light in the y-direction. In this way, a single MEMS mirror is able to steer light beams received from the illumination unit 10 in both the x-direction and the y-direction. As a result, the MEMS mirror 12xy can direct a light beam at a desired 2D coordinate (e.g., an x-y coordinate) in the field of view. Multiple light beams can be steered by the MEMS mirror 12xy at different 2D coordinates of a Lissajous pattern.

Each MEMS mirror 12x, 12y, and 12xy is a resonator (i.e., a resonant MEMS mirror) configured to oscillate "side-to-side" about each of its scanning axes at a resonance frequency such that the light reflected from the MEMS mirror oscillates back and forth in a scanning direction of a respective scanning axis. As will be described in further detail below, different resonance frequencies may be used for each scanning axis 13x and 13y for defining the Lissajous pattern.

The Lissajous scanning systems 100A and 110B each includes an illumination unit 10 (i.e., a light transmitter) that includes at least one light source (e.g., at least one laser diode or light emitting diode) that is configured to transmit light beams (pulses) along a transmission path towards the MEMS mirror(s). The illumination unit 10 may sequentially transmit multiple light pulses according to a trigger signal received from a system controller 23.

The Lissajous scanning systems 100A and 110B also include a system controller 23 that is configured to control components of the scanning systems. In certain applications, such as LIDAR, the system controller 23 may also be configured to receive raw data from a light sensor (not illustrated) and perform processing thereon (e.g., via digital signal processing) for generating object data (e.g., point cloud data). Thus, the system controller 23 includes at least one processor and/or processor circuitry (e.g., comparators, TDCs, ADCs, and digital signal processors (DSPs)) of a signal processing chain for processing data, as well as control circuitry, such as a microcontroller, that is configured to generate control signals.

The system controller 23 is configured to generate a trigger signal used to trigger the illumination unit 10 to generate light pulses. Thus, the system controller 23 controls the timing light pulses are fired from the illumination unit 10 via the trigger signal. The system controller 23 is also configured to set a driving frequency of a MEMS mirror for each of its scanning axes and is capable of synchronizing the oscillations about the two scanning axes 13x and 13y.

The Lissajous scanning systems 100A and 110B both include a MEMS driver 25x for driving a MEMS mirror (i.e., MEMS mirror 12x or 12xy) about the first scanning axis 13x and a MEMS driver 25y for driving a MEMS mirror (i.e., MEMS mirror 12y or 12xy) about the second scanning axis 13y. Each MEMS driver 25x, 25y actuates and senses the rotation position of the mirror about its respective scanning axis, and provides position information (e.g., tilt angle or degree of rotation about the rotation axis) of the mirror to the system controller 23. Based on this position information, the laser sources of the illumination unit 10 may be triggered by the system controller 23. Thus, a higher accuracy in position sensing of the MEMS mirror results in a more accurate and precise control of other components of the scanning system.

A drive voltage (i.e., an actuation or driving signal) is applied by a MEMS driver to an actuator structure of the MEMS mirror that corresponds to its corresponding scanning axis to drive the oscillation of the MEMS mirror about that scanning axis. The drive voltage may be referred to as a high-voltage (HV). The actuator structure may include interdigitated finger electrodes made of interdigitated mirror combs and frame combs to which a drive voltage (i.e., an actuation or driving signal) is applied by the MEMS driver. The drive voltage applied to the actuator structure creates a driving force between, for example, interdigitated mirror combs and the frame combs, which creates a torque on the mirror body about the rotation axis. The drive voltage can be switched or toggled on and off (HV on/off) resulting in an oscillating driving force. The oscillating driving force causes the mirror to oscillate back and forth on its rotation axis between two extrema. The drive voltage may be a constant drive voltage, meaning that the drive voltage is the same voltage when actuated (i.e., toggled on). However, it will be understood that the drive voltage is being toggled on and off in order to produce the mirror oscillation. Depending on the configuration, this actuation can be regulated or adjusted by adjusting the drive voltage off time, a voltage level of the drive voltage, or a duty cycle.

In other embodiments, an electromagnetic actuator may be used to drive a MEMS mirror about a corresponding scanning axis. For an electromagnetic actuator, a driving current (i.e., an actuation or driving signal) may be used to generate the oscillating driving force. Thus, it will be appreciated that drive/driving voltage and drive/driving current may be used interchangeably herein to indicate an actuation signal or a driving signal, and both may generally be referred to as a driving force.

Hence, a transmission technique includes transmitting the beams of light into the field of view from one or two transmission mirrors that use two resonant scanning axes to transmit according to a Lissajous scanning pattern. The transmission mirrors continuously oscillate in resonance about each scanning axes such that the beams of light are projected into the field of view that moves across the field of view as the transmission mirror(s) changes the transmission direction. Moreover, additional conditions are set by the system controller 23 in order to generate the Lissajous scanning pattern as a dense, rectangular, repeatable pattern. The following conditions are used to synchronize the driving about the two scanning axes while also maximizing the pattern density of laser triggering according to the Lissajous pattern.

To make the Lissajous pattern reproduce itself periodically with a frame rate FR frequency [Hz] there are additional conditions on frequencies f1, f2 to be satisfied, wherein f1 is the driving frequency in the time domain of a MEMS mirror (e.g., MEMS mirror 12x or 12xy) about the scanning axis 13x and f2 is the driving frequency in the time domain of a MEMS mirror (e.g., MEMS mirror 12y or 12xy) about the scanning axis 13y. However, the oscillations about the two scanning axes may be out to synchronization and must be brought into synchronization by the system controller 23.

For example, coordinates X,Y of a transmitted light beam are defined parametrically as oscillatory behaving variables in the time domain according to the following equations:

$$X=\sin(2\pi*f1*t) \quad (1),$$

$$Y=\sin(2\pi*f2*t) \quad (2).$$

X is the x-coordinate that corresponds to the rotation angle X of a MEMS mirror about scanning axis 13x and Y is the y-coordinate that corresponds to the rotation angle Y of a MEMS mirror about scanning axis 13y. The X and Y coordinates are sinusoidal functions that depend on driving frequency f1, f2 and time (t). However, prior to synchronization, the X and Y angles may be represented by the following equations:

$$\text{Angle } X=\sin(2\pi*t*f1r+\varphi) \quad (3),$$

$$\text{Angle } Y=\sin(2\pi*t*f2r) \quad (4),$$

where a random phase $\varphi$ and random frequencies f1r, f2r indicate that the oscillations about the two scanning axes could be out of synchronization.

To create repeatable pattern (frame) with the frame rate FR, the system controller 23 is configured to apply synchronization and frequency tuning via control signals to the MEMS drivers 25x and 25y. As the frame rate FR is predefined, the system controller 23 uses the predefined frame rate FR as the greatest common divisor for selecting frequencies f1 and f2. In other words, the system controller 23 selects frequencies f1 and f2 such that the frame rate FR is their greatest common divisor:

$$\text{Greatest Common Divisor}(f1,f2)=FR(\text{predefined}) \quad (5).$$

Moreover, frequencies f1 and f2 are set to satisfy the following equation:

$$f2-f1=(2*N+1)*FR, \text{ where } N=0,1,2,3 \quad (6).$$

Hence, N is an integer equal to or greater than zero. Lastly, for synchronization and tuning operation, the system controller 23 synchronizes the oscillations about the two scanning axes such that the phase difference therebetween is zero:

$$\varphi=0 \quad (7).$$

Figure 2:
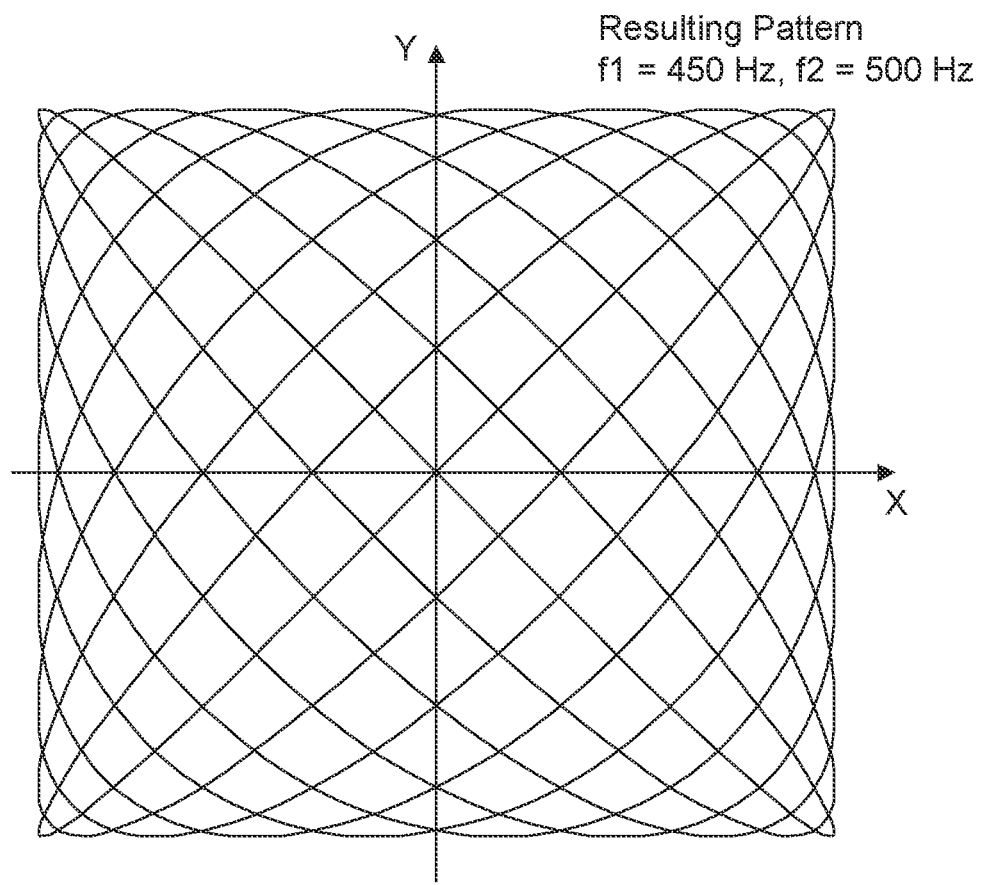
FIG. 2 shows an example of a resulting Lissajous pattern according to set parameters implemented in the Lissajous scanning systems of FIGS. 1A and 1B.

Thus, the two resonant scanning axes are each driven at constant scanning frequency f1, f2 with a defined frequency ratio/difference therebetween according to equations (5), (6), and (7) that forms a repeatable Lissajous pattern (frame) with a frame rate FR. For example, with a frame rate FR of 50 Hz and N set to zero, f1=450 Hz and f2=500 Hz. FIG. 2 shows an example of a resulting Lissajous pattern according to these set parameters. As a result of the synchronization and tuning, the system controller 23 has determined frequencies f1 and f2 according to the desired frame rate FR and has eliminated any existing phase difference between the scanning axes.

The next step in generating Lissajous scanning pattern as a dense, rectangular, repeatable pattern requires determining $t_i$ time moments (i.e., time steps) for laser triggering. A time moment is a moment at which the illumination unit 10 is triggered to fire a light pulse and further corresponds to target X, Y coordinate of the Lissajous pattern. The system controller 23 generates the trigger signal (e.g., a pulsed signal) to trigger a light pulse at each determined $t_i$ time moment. The illumination unit 10 may generate a light pulse at signal pulse of the trigger signal. The time moments ti are calculated such that the X, Y coordinates of the light pulses transmitted into the field of view define a dense, rectangular, repeatable pattern, where the pattern density of the X, Y coordinates is maximized for the predefined frame rate FR.

In order to determine each of the ti time moments for laser triggering, the system controller 23 converts the driving frequencies f1, f2 into dimensionless frequencies (i.e., into a dimensionless time domain) according to the following equations:

$$F_1 = \frac{f_1}{FR}, \quad (8)$$

$$F_2 = \frac{f_2}{FR}, \quad (9)$$

where F1 is the dimensionless frequency of driving frequency f1 and F2 is the dimensionless frequency of driving frequency f2. As can be appreciated, the dimensionless frequencies F1 and F2 are calculated by dividing f1 and f2 by the frame rate FR. The dimensionless frequencies F1 and F2 represent a number of oscillations a MEMS mirror undergoes about its respective scanning axis within one frame (i.e., over a single Lissajous pattern). For example, using the example of f1=450, f2=500, and FR=50, F1=9 and F2=10.

Next, the system controller 23 uses the dimensionless frequencies F1 and F2 to calculate a dimensionless time interval Δt between time moments according to the following equation:

$$\Delta t = \frac{1}{4F_1F_2}. \quad (10)$$

Next, the system controller 23 uses the dimensionless time interval Δt to calculate dimensionless ti time moments for each laser triggering according to the following equation:

$$T_i = \Delta t * (i + 0.5) = \frac{2i+1}{8F_1F_2}, \quad (11)$$

where $i = 0, 1, 2, 3 \ldots (4F_1F_2 - 1)$.

It is possible to calculate the dimensionless ti time moments directly from equations (8) and (9). Each ti time moment represents a time at which a light pulse is triggered at the illumination unit 10 and there are 4F1F2 time moments (i.e., the number of time moments in one period of the Lissajous pattern) that are determined and stored. In other words, there are 4F1F2 light pulses triggered in a single Lissajous frame or period before the pattern repeats itself. A number of 4F1F2 light pulses are triggered for each Lissajous frame or period.

The Lissajous pattern is reproduced by a set of Xi, Yi coordinates that is rectangular and periodic in time with a period $T_{FR}$ equal to 1/FR. The Xi, Yi coordinates are represented by the following equations:

$$X_i = \sin(2\pi * t_i * F_1) \quad (12),$$

$$Y_i = \sin(2\pi * t_i * F_2) \quad (13).$$

Thus, a laser pulse triggered at time moment ti is transmitted into the field of view by the MEMS mirrors 12x, 12y or MEMS mirror 12xy at a 2D coordinate of Xi, Yi. An Xi, Yi coordinate corresponds to an angular position about the scanning axis 13x and an angular position about the scanning axis 13y. Thus, as the MEMS mirror(s) 12x, 12y, 12xy are being driven about their respective scanning axes 13x and 13y according to the configured Lissajous scanning pattern, the illumination unit 10 is triggered to fire each light pulse at a precise time moment ti that corresponds to an angular position about the scanning axis 13x and an angular position about the scanning axis 13y (i.e., according to an Xi, Yi coordinate).

The set of Xi, Yi coordinates may also be represented in real time and frequencies according to the following equations:

$$t_i = \frac{2i+1}{8 * FR * F_1F_2}, \quad (14)$$

$$X_i = \sin(2\pi * t_i * f_1), \quad (15)$$

$$Y_i = \sin(2\pi * t_i * f_2), \quad (16)$$

$$i = 0, 1, 2, 3, \ldots (4F_1F_2 - 1). \quad (17)$$

Figure 3A:
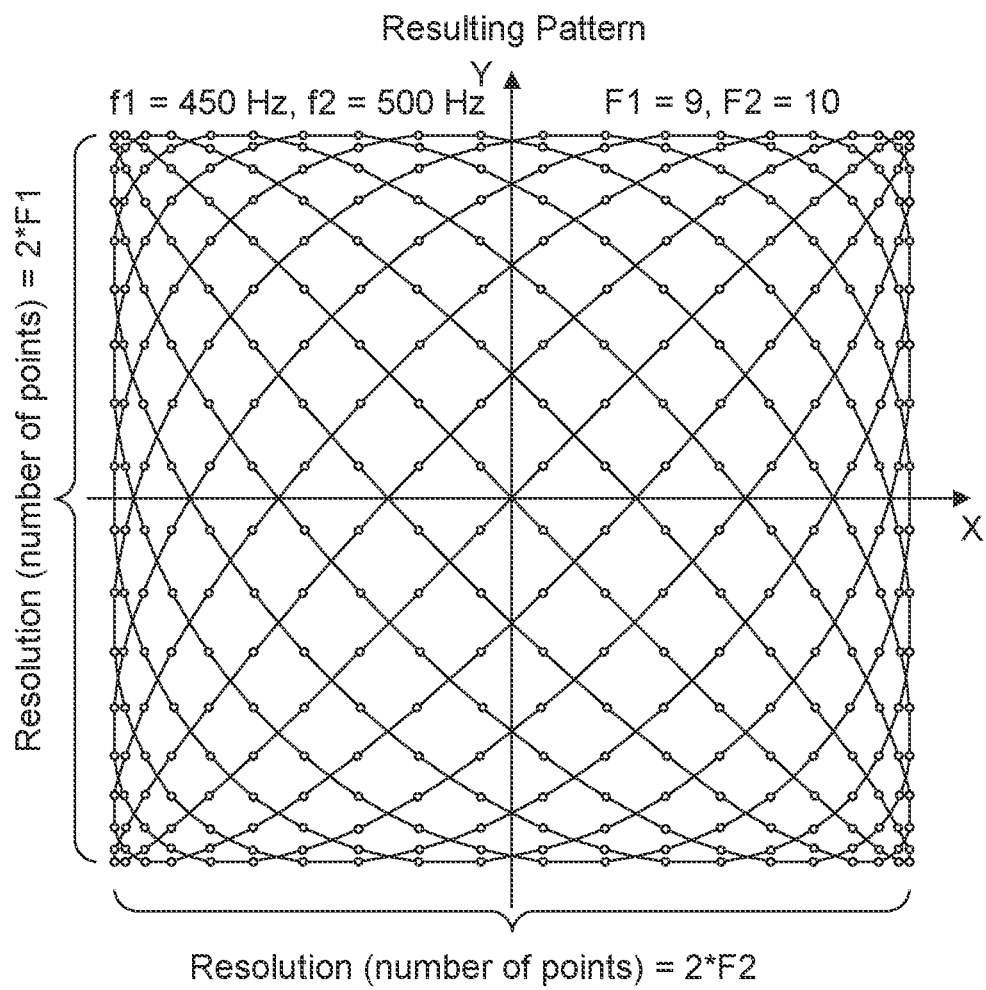
FIG. 3A shows a Lissajous scanning pattern resultant from driving one or two MEMS mirrors about respective that is further overlaid with a laser firing pattern that tracks the Lissajous scanning pattern according to calculated time moments according to one or more embodiments.

FIG. 3A shows a Lissajous scanning pattern resultant from driving one or two MEMS mirrors about scanning axes 13x and 13y that is further overlaid with a laser firing pattern that tracks the Lissajous scanning pattern according to the calculated ti time moments. In other words, each dot represents a light pulse that is fired at a ti time moment corresponding to an Xi, Yi coordinate. The resolution of the laser firing pattern is defined by 2*F1 and 2*F2 or 4F1F2.

Figure 3B:
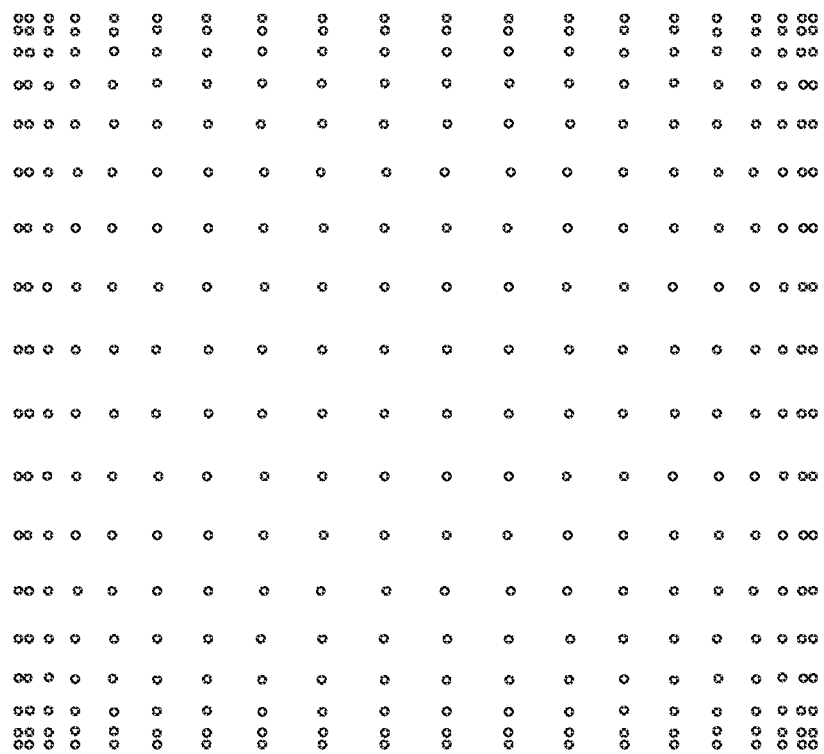
FIG. 3B shows the laser firing pattern from FIG. 3A showing a dense, rectangular, repeatable, real-time light transmission pattern produced according to one or more embodiments.

FIG. 3B shows the laser firing pattern from FIG. 3A to more clearly show the dense, rectangular, repeatable, real-time light transmission pattern produced by the above-described algorithm.

Figure 4:
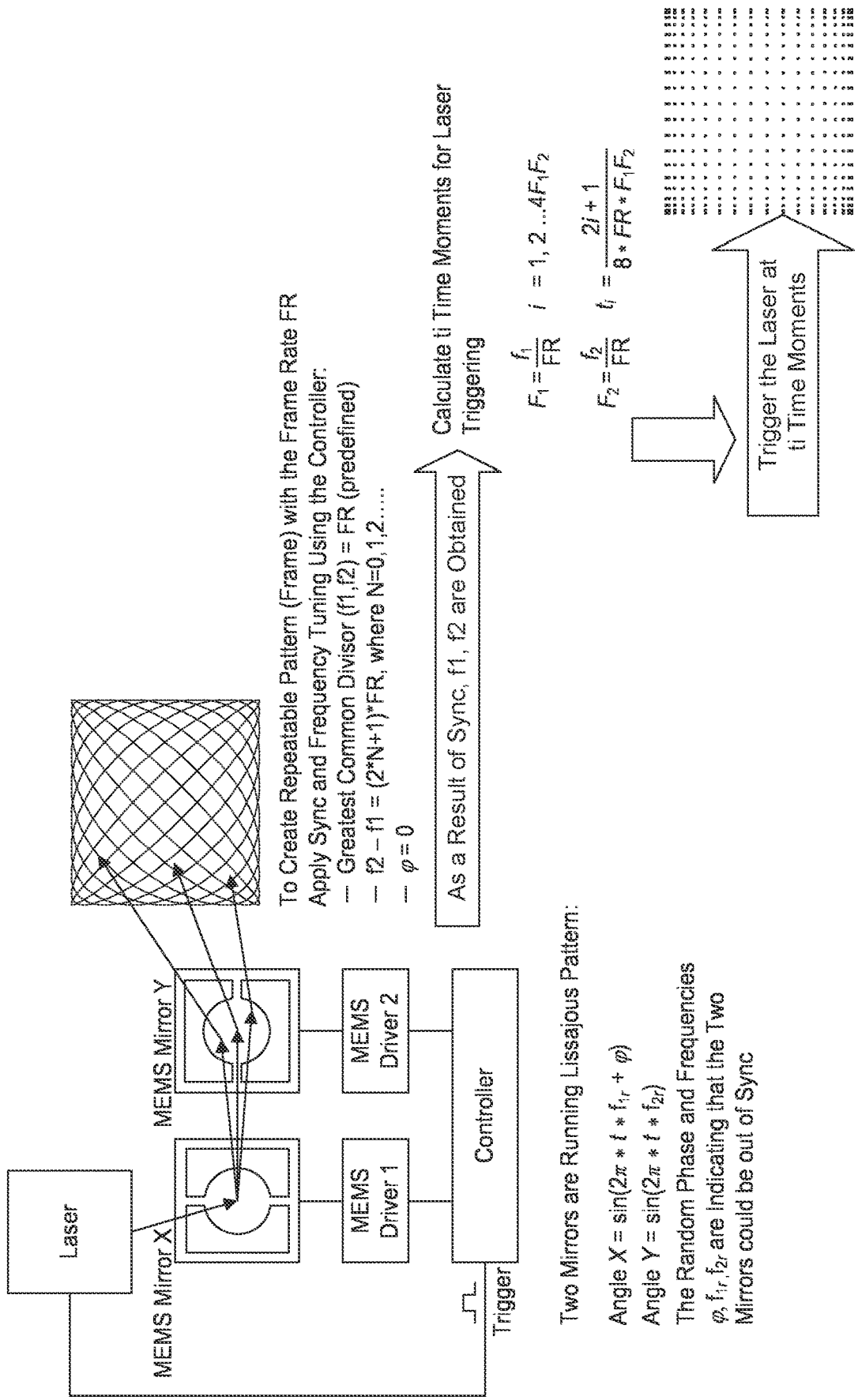
FIG. 4 shows a control diagram implemented by a Lissajous scanning system in order to generate a rectangular 2D light transmission pattern with Lissajous scanning according to one or more embodiments.

FIG. 4 shows a control diagram implemented by the system controller 23 in order to generate the rectangular 2D light transmission pattern with Lissajous scanning according to the above description. The control diagram starts by running the two MEMS mirrors 12x and 12y with Lissajous scanning, then proceeds to create a repeatable Lissajous scanning pattern with a frame rate FR and zero phase difference, then proceeds to calculating ti time moments represented by equation (14), and finally proceeds to using a trigger signal to trigger laser pulses at each of the determined ti time moments while the two MEMS mirrors 12x and 12y are oscillating in synchronization according to the controlled and Lissajous scanning pattern.

It will be further appreciated that the sin function can substituted with any periodic continuous function func(x) which has following additional features:
1) func(x+2π)=func(x) and symmetric around π/2 and 3π/2, and
2) func(k*π/2+x)=func(k*π/2−x), k=1, 3.

The func(x+2π)=func(x) is a continuous periodic function, and additionally symmetric around π/2 and 3π/2, func(k*π/2+x)=func(k*π/2−x), k=1, 3. x represents either 2π*t*f₁ or 2π*t*f₂. Written differently, the function func(2π*t*f₁+2π)=func(2π*t*f₁) is a continuous periodic function, and additionally symmetric around π/2 and 3π/2, func(k*π/2+x*t*f₁)=func(k*π/2−2π*t*f₁), k=1 or 3, and wherein the function func(2π*t*f₂+2π)=func(2π*t*f₂) is a continuous periodic function, and additionally symmetric around π/2 and 3π/2, func(k*π/2+2π*t*f₂)=func(k*π/2−2π*t*f₂), k=1 or 3.

Thus, sinusoidal wave functions, triangular wave functions, square wave functions, and the like may be used to reproduce the Lissajous scanning pattern and determine the time moments for laser triggering.

Although embodiments described herein relate to MEMS devices with at least one MEMS mirror, it is to be understood that other implementations may include optical devices other than MEMS mirror devices, including other non-MEMS resonant oscillating structures that are used to steer light according to a Lissajous scanning pattern. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

It is further to be noted that methods disclosed in the specification or in the claims may be implemented by a device having means for performing each of the respective acts of these methods. Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A Lissajous scanning system, comprising:
   a transmitter configured to transmit a plurality of light pulses at a plurality of time moments based on a trigger signal, wherein each light pulse is triggered at a respective time moment;
   a first oscillator structure configured to oscillate about a first rotation axis;
   a second oscillator structure configured to oscillate about a second rotation axis;
   a driver circuit configured to generate a first driving signal to drive the first oscillator structure about the first rotation axis at a first driving frequency (f1) and generate a second driving signal to drive the second oscillator structure about the second rotation axis at a second driving frequency (f2); and
   a controller configured to control the first driving signal and the second driving signal in order to synchronize the first and the second oscillator structures and to generate a Lissajous scanning pattern according to a predefined frame rate (FR),
   wherein the controller is configured to select the first driving frequency and second driving frequency such that the frame rate is a greatest common divisor of the first driving frequency and second driving frequency and such that they satisfy the following equation:
   f2−f1=(2*N+1)*FR, wherein N is an integer equal to or greater than zero,
   wherein the controller is further configured to determine the plurality of time moments and generate the trigger signal based on the determined plurality of time moments,
   wherein the controller is configured to determine the plurality of time moments ($t_i$) according to the following equation:

$$t_i = \frac{2i+1}{8*FR*F_1F_2},$$

where: $F_1 = \frac{f_1}{FR}$, $F_2 = \frac{f_2}{FR}$, $i = 0, 1, 2 \ldots (4F_1F_2 - 1)$.

2. The Lissajous scanning system of claim 1, wherein the controller is configured to control the first driving signal and the second driving signal in order to synchronize the first and the second oscillator structures such that a phase difference between an oscillation of the first oscillator structure and an oscillation of the second oscillator structure is zero.

3. The Lissajous scanning system of claim 1, wherein:
   a first angular position of the first oscillator structure about the first rotation axis defines a first portion of a light transmission coordinate and a second angular position of the second oscillator structure about the second rotation axis defines a second portion of the light transmission coordinate, and
   each of the plurality of light pulses is transmitted at a different light transmission coordinate.

4. The Lissajous scanning system of claim 3, wherein a transmission pattern of the plurality of light pulses is rectangular.

5. The Lissajous scanning system of claim 4, wherein a pattern density of the transmission pattern is maximized for the predefined frame rate.

6. The Lissajous scanning system of claim 3, wherein the light transmission coordinate of each of the plurality of light pulses is defined by:

$$X_i = \sin(2\pi * t_i * f_1),$$

$$Y_i = \sin(2\pi * t_i * f_2), \text{ and}$$

$$i = 0, 1, 2 \ldots (4F_1F_2 - 1),$$

where $X_i$ is the first portion of a light transmission coordinate and Yi is the second portion of a light transmission coordinate.

7. The Lissajous scanning system of claim 3, wherein the light transmission coordinate of each of the plurality of light pulses is defined by:

$$X_i = \text{func}(2\pi * t_i * f_1),$$

$$Y_i = \text{func}(2\pi * t_i * f_2), \text{ and}$$

$$i = 0, 1, 2 \ldots (4F_1F_2 - 1),$$

where $X_i$ is the first portion of a light transmission coordinate and Yi is the second portion of a light transmission coordinate, and func is a continuous periodic function that is symmetric about $\pi/2$ and $3\pi/2$.

8. The Lissajous scanning system of claim 1, wherein the Lissajous scanning pattern is reproduced over a Lissajous frame, the plurality of light pulses are transmitted during the Lissajous frame, and the controller is configured to repeat the Lissajous scanning pattern for each Lissajous frame of a plurality of Lissajous frames.

9. The Lissajous scanning system of claim 8, wherein the controller is configured to repeat the trigger signal according to the determined plurality of time moments for each of the plurality of Lissajous frames.

10. The Lissajous scanning system of claim 1, wherein the Lissajous scanning pattern is defined by:

Angle $X = \sin(2\pi * t * f_1)$, and

Angle $Y = \sin(2\pi * t * f_2)$, wherein Angle X is a rotation angle of the first oscillator structure about the first rotation axis over time (t) and Angle Y is a rotation angle of the second oscillator structure about the second rotation axis over time (t).

11. The Lissajous scanning system of claim 1, wherein the Lissajous scanning pattern is defined by:

Angle $X = \text{func}(2\pi * t * f_1)$, and

Angle $Y = \text{func}(2\pi * t * f_2)$, wherein Angle X is a rotation angle of the first oscillator structure about the first rotation axis over time (t) and Angle Y is a rotation angle of the second oscillator structure about the second rotation axis over time (t), and wherein the function $\text{func}(2\pi * t * f_1 + 2\pi) = \text{func}(2\pi * t * f_1)$ is a continuous periodic function that is symmetric around $\pi/2$ and $3\pi/2$, $\text{func}(k*\pi/2 + 2\pi * t * f_1) = \text{func}(k*\pi/2 - 2\pi * t * f_1)$, k=1 or 3, and wherein the function $\text{func}(2\pi * t * f_2 + 2\pi) = \text{func}(2\pi * t * f_2)$ is a continuous periodic function that is symmetric around $\pi/2$ and $3\pi/2$, $\text{func}(k*\pi/2 + 2\pi * t * f_2) = \text{func}(k*\pi/2 - 2\pi * t * f_2)$, k=1 or 3.

12. A Lissajous scanning system, comprising:
a transmitter configured to transmit a plurality of light pulses at a plurality of time moments based on a trigger signal, wherein each light pulse is triggered at a respective time moment;
an oscillator structure configured to oscillate about a first rotation axis and oscillate about a second rotation axis;
a driver circuit configured to generate a first driving signal to drive the oscillator structure about the first rotation axis at a first driving frequency (f1) and generate a second driving signal to drive the oscillator structure about the second rotation axis at a second driving frequency (f2); and
a controller configured to control the first driving signal and the second driving signal in order to synchronize oscillations of the oscillation structure about the first and the second rotation axes and to generate a Lissajous scanning pattern according to a predefined frame rate (FR),
wherein the controller is configured to select the first driving frequency and second driving frequency such that the frame rate is a greatest common divisor of the first driving frequency and second driving frequency and such that they satisfy the following equation:
f2−f1=(2*N+1)*FR, wherein N is an integer equal to or greater than zero,
wherein the controller is further configured to determine the plurality of time moments and generate the trigger signal based on the determined plurality of time moments,
wherein the controller is configured to determine the plurality of time moments ($t_i$) according to the following equation:

$$t_i = \frac{2i+1}{8 * FR * F_1 F_2},$$

where: $F_1 = \frac{f_1}{FR}, F_2 = \frac{f_2}{FR}, i = 0, 1, 2 \ldots (4F_1F_2 - 1).$ 13. The Lissajous scanning system of claim 12, wherein the controller is configured to control the first driving signal and the second driving signal in order to synchronize the oscillations of the oscillator structure about the first and the second rotation axes such that a phase difference between the oscillations is zero.

14. The Lissajous scanning system of claim 12, wherein:
a first angular position of the oscillator structure about the first rotation axis defines a first portion of a light transmission coordinate and a second angular position of the oscillator structure about the second rotation axis defines a second portion of the light transmission coordinate, and
each of the plurality of light pulses is transmitted at a different light transmission coordinate.

15. The Lissajous scanning system of claim 14, wherein a transmission pattern of the plurality of light pulses is rectangular.

16. The Lissajous scanning system of claim 15, wherein a pattern density of the transmission pattern is maximized for the predefined frame rate.

17. The Lissajous scanning system of claim 14, wherein the light transmission coordinate of each of the plurality of light pulses is defined by:

$$X_i = \sin(2\pi * t_i * f_1),$$

$$Y_i = \sin(2\pi * t_i * f_2), \text{ and}$$

$$i = 0, 1, 2 \ldots (4F_1F_2 - 1),$$

where $X_i$ is the first portion of a light transmission coordinate and Yi is the second portion of a light transmission coordinate.

18. The Lissajous scanning system of claim 14, wherein the light transmission coordinate of each of the plurality of light pulses is defined by:

$$X_i = \text{func}(2\pi * t_i * f_1),$$

$$Y_i = \text{func}(2\pi * t_i * f_2), \text{ and}$$

$$i = 0, 1, 2 \ldots (4F_1F_2 - 1),$$

where $X_i$ is the first portion of a light transmission coordinate and Yi is the second portion of a light transmission coordinate, and func is a continuous periodic function that is symmetric about $\pi/2$ and $3\pi/2$.

19. The Lissajous scanning system of claim 12, wherein the Lissajous scanning pattern is reproduced over a Lissajous frame, the plurality of light pulses are transmitted during the Lissajous frame, and the controller is configured to repeat the Lissajous scanning pattern for each Lissajous frame of a plurality of Lissajous frames.

20. The Lissajous scanning system of claim 19, wherein the controller is configured to repeat the trigger signal according to the determined plurality of time moments for each of the plurality of Lissajous frames.

21. The Lissajous scanning system of claim 12, wherein the Lissajous scanning pattern is defined by:

$$\text{Angle } X = \sin(2\pi * t * f_1), \text{ and}$$

$$\text{Angle } Y = \sin(2\pi * t * f_2),$$

wherein Angle X is a rotation angle of the oscillator structure about the first rotation axis over time (t) and Angle Y is a rotation angle of the oscillator structure about the second rotation axis over time (t).

22. The Lissajous scanning system of claim 12, wherein the Lissajous scanning pattern is defined by:

$$\text{Angle } X = \text{func}(2\pi * t * f_1), \text{ and}$$

$$\text{Angle } Y = \text{func}(2\pi * t * f_2),$$

wherein Angle X is a rotation angle of the oscillator structure about the first rotation axis over time (t) and Angle Y is a rotation angle of the oscillator structure about the second rotation axis over time (t), and wherein the function $\text{func}(2\pi * t * f_1 + 2\pi) = \text{func}(2\pi * t * f_1)$ is a continuous periodic function that is symmetric around $\pi/2$ and $3\pi/2$, $\text{func}(k * \pi/2 + 2\pi * t * f_1) = \text{func}(k * \pi/2 - 2\pi * t * f_1)$, k=1 or 3, and wherein the function $\text{func}(2\pi * t * f_2 + 2\pi) = \text{func}(2\pi * t * f_2)$ is a continuous periodic function that is symmetric around $\pi/2$ and $3\pi/2$, $\text{func}(k * \pi/2 + 2\pi * t * f_2) = \text{func}(k * \pi/2 - 2\pi * t * f_2)$, k=1 or 3.

23. A method of Lissajous scanning, comprising:
transmitting a plurality of light pulses at a plurality of time moments based on a trigger signal, wherein each light pulse is triggered at a respective time moment;
driving a first oscillator structure about a first rotation axis at a first driving frequency (f1) according to a first driving signal;
driving a second oscillator structure about a second rotation axis at a second driving frequency ($f_2$) according to second driving signal;
controlling the first driving signal and the second driving signal in order to synchronize the first and the second oscillator structures and to generate a Lissajous scanning pattern according to a predefined frame rate (FR);
selecting the first driving frequency and second driving frequency such that the frame rate is a greatest common divisor of the first driving frequency and second driving frequency and such that they satisfy the following equation:
f2−f1=(2*N+1)*FR, wherein N is an integer equal to or greater than zero;
determining the plurality of time moments; and
generating the trigger signal based on the determined plurality of time moments,
wherein the plurality of time moments ($t_i$) are determined according to the following equation:

$$t_i = \frac{2i+1}{8 * FR * F_1 F_2},$$

$$\text{where: } F_1 = \frac{f_1}{FR}, F_2 = \frac{f_2}{FR}, i = 0, 1, 2 \ldots (4F_1F_2 - 1).$$

24. A method of Lissajous scanning, comprising:
transmitting a plurality of light pulses at a plurality of time moments based on a trigger signal, wherein each light pulse is triggered at a respective time moment;
driving an oscillator structure about a first rotation axis at a first driving frequency (f1) according to a first driving signal;
driving the oscillator structure about a second rotation axis at a second driving frequency (f2) according to second driving signal;
controlling the first driving signal and the second driving signal in order to synchronize oscillations of the oscillation structure about the first and the second rotation axes and to generate a Lissajous scanning pattern according to a predefined frame rate (FR);
selecting the first driving frequency and second driving frequency such that the frame rate is a greatest common divisor of the first driving frequency and second driving frequency and such that they satisfy the following equation:
f2−f1=(2*N+1)*FR, wherein N is an integer equal to or greater than zero;
determining the plurality of time moments; and
generating the trigger signal based on the determined plurality of time moments,
wherein the plurality of time moments ($t_i$) are determined according to the following equation:

$$t_i = \frac{2i+1}{8 * FR * F_1 F_2},$$

$$\text{where: } F_1 = \frac{f_1}{FR}, F_2 = \frac{f_2}{FR}, i = 0, 1, 2 \ldots (4F_1F_2 - 1).$$

* * * * *